Jan. 12, 1965  A. D. RUEDEMANN, JR  3,165,357
VEHICLE SAFETY SEAT
Filed Aug. 14, 1961  2 Sheets-Sheet 1
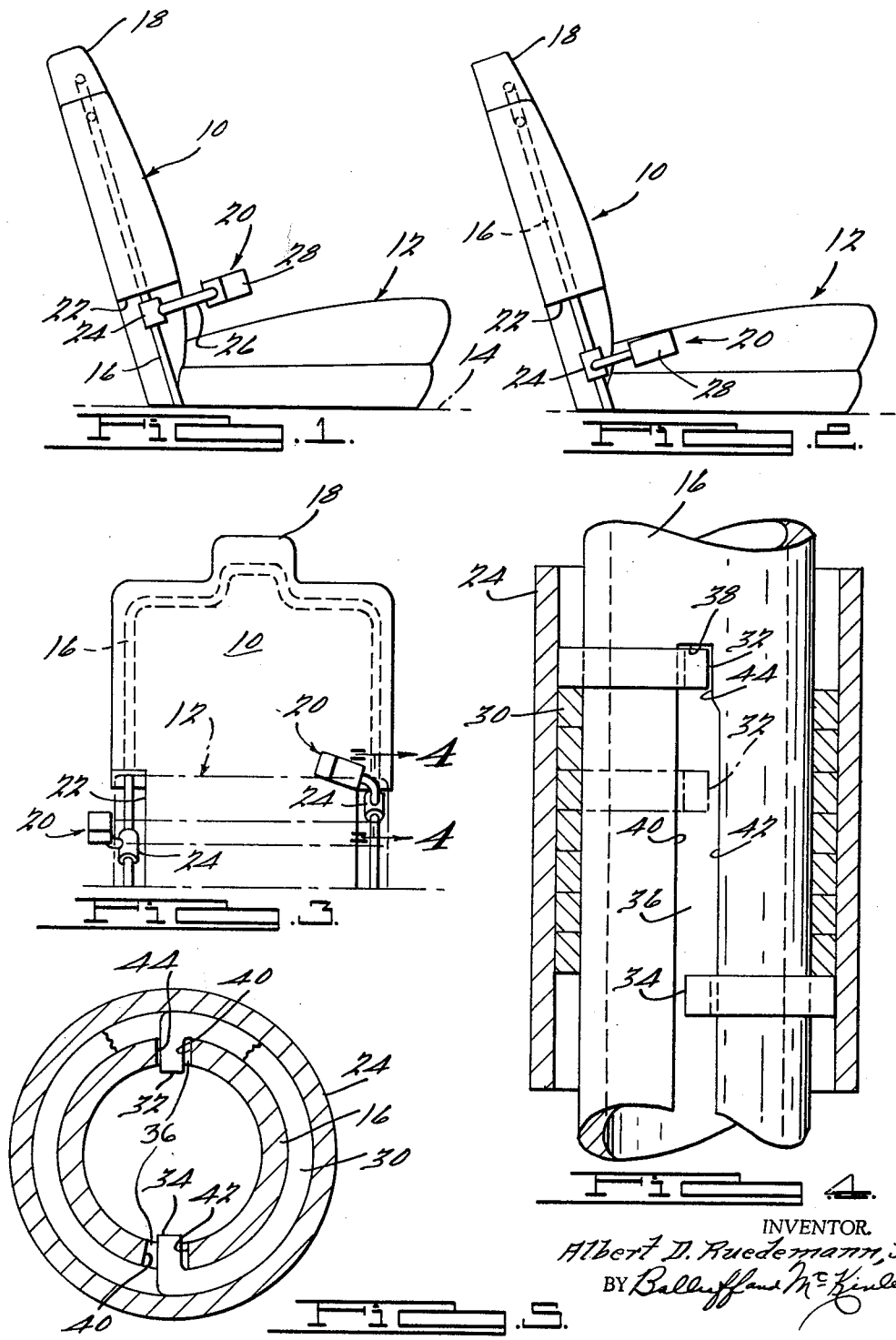
INVENTOR.
Albert D. Ruedemann, Jr.
BY
ATTORNEYS

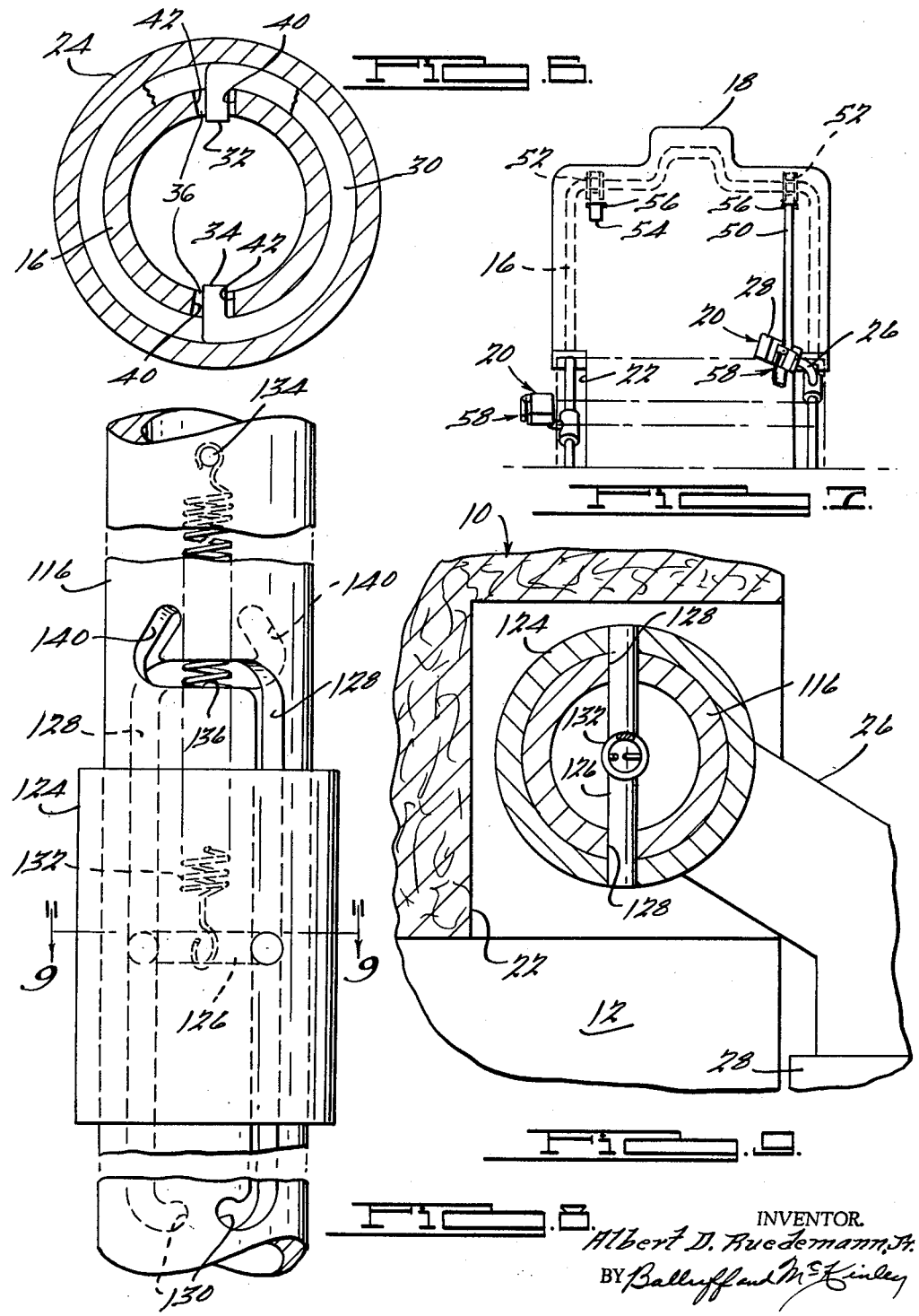

United States Patent Office 3,165,357
Patented Jan. 12, 1965

3,165,357
VEHICLE SAFETY SEAT
Albert D. Ruedemann, Jr., 242 Lewiston Road,
Grosse Pointe Farms 36, Mich.
Filed Aug. 14, 1961, Ser. No. 131,136
11 Claims. (Cl. 297—384)

This invention relates to a safety seat for vehicles which is designed to provide maximum protection for the occupant when the vehicle is rapidly decelerated or involved in a collision. More particularly, the invention is directed to an improved safety bar construction to prevent the occupant from being thrown forwardly when the vehicle is stopped abruptly. The invention is particularly useful in automotive vehicles, but obviously may be used in other types of vehicles.

The seat belts which are available as optional equipment on current automotive vehicles have not been favorably accepted by the public. It is an object of the present invention to provide a safety device for automotive vehicle seats which does not detract from the appearance of the vehicle interior and which is very easy to operate, thereby overcoming some of the disadvantages of the conventional seat belts. In general, the present invention includes a safety bar mounted on a frame member at each side of the seat and adapted to be moved between a storage or inoperative position below the level of the seat at the side thereof and an operative position in which the bar may be swung inwardly into engagement with the anterior superior spine of the ilium of the occupant. The safety bars are automatically locked in such position and the particular location thereof as described represents the optimum position for restraining the occupant from being thrown forwardly and at the same time does not cause any discomfort that is necessarily involved in the use of seat belts. The safety bars are covered with an energy absorbing material to prevent injury to the occupant and are so designed that they engage only those areas of the body which are best suited to withstand the impact of sudden stoppage of the vehicle. The safety device is also particularly suited for the use of shoulder straps in conjunction therewith to prevent the upper portion of the occupant's body from being thrown forwardly into the steering wheel or dashboard of the vehicle.

It is therefore a principal object of the invention to provide a new and improved safety seat for vehicles.

A further object of the invention is to provide a safety seat having a safety bar at each side thereof which may be raised from a lower inoperative position to an upper operative position in which it may be swung inwardly into engagement with the anterior superior spine of the ilium of the occupant. A further object of the invention is to provide a safety device of the type described in which the safety bars are automatically locked in such operative position against movement resulting from the occupant being thrown forwardly when the vehicle is abruptly stopped and which can be released by a simple manipulation thereof by the occupant.

A further object of the invention is to provide a safety seat of the type described having a shoulder harness incorporated therein for restraining the upper portion of the occupant's body against forward movement.

Other and further objects of the invention will be apparent from the following description and claims and may be understood by reference to the accompanying drawings, of which there are two sheets, which by way of illustration show preferred embodiments of the invention and what I now consider to be the best mode of applying the principles thereof. Other embodiments of the invention may be used without departing from the scope of the present invention as set forth in the appended claims.

In the drawings:
FIG. 1 is a side elevational view of a vehicle seat constructed according to the present invention and showing one of the safety bars in its operative position;
FIG. 2 is a view similar of FIG. 1 illustrating the safety bar in its lower or inopeartive position;
FIG. 3 is a front elevational view of the seat structure shown in FIGS. 1 and 2;
FIG. 4 is a sectional view taken on line 4—4 of FIG. 3 and illustrating one type of lock mechanism that may be employed;
FIG. 5 is a horizontal sectional view through the lock mechanism illustrated in FIG. 4;
FIG. 6 is a view similar to FIG. 5 but showing the lock mechanism in the lower or inoperative position of the safety bar;
FIG. 7 is a front elevational view of a modified seat construction having shoulder straps incorporated therein;
FIG. 8 is a fragmentary elevational view of a modified type of lock mechanism for the safety bar; and
FIG. 9 is a sectional view taken on line 9—9 of FIG. 8.

A safety seat according to the present invention includes a seat having a back portion 10 and a seat portion 12 mounted on the floor 14 of the vehicle. A tubular frame member 16 extends upwardly within the seat back 10 along each side thereof and generally horizontally across the top of the seat back. The lower ends of the frame member 16 are rigidly anchored to the floor or the frame of the vehicle to securely anchor the seat against forward movement. The central portion of the top of the seat back and the frame member 16 are extended upwardly as at 18 to provide a head-rest to prevent whiplash injury in the event the vehicle is struck from behind. The frame member 16 is preferably of such height as to provide a roll-over bar.

A safety bar indicated generally at 20 is mounted on the frame member 16 at each side thereof. The seat back 10 may be cut out as at 22 at each side thereof so as to expose the lower portions of the frame member 16. A sleeve 24 is vertically slidable and rotatable on the frame member 16 and has an integral arm 26 extending generally laterally therefrom. At least the outer end portions of the arms 26 are covered with shock-absorbent padding 28 of any suitable type. The safety bars 20 may be moved between the lower inoperative position shown in FIG. 2 and the left side of FIG. 3 and the operative position thereof shown in FIG. 1 and the right side of FIG. 3.

In the form of the invention shown in FIGS. 1 to 6, a spring 30 is interposed between the sleeve 24 and the frame member 16. The spring 30 has its upper and lower ends 32 and 34, respectively, bent inwardly into a vertically extending slot 36 in the frame member 16. The slot 36 is of sufficient length to enable the sleeve 24 and the spring 30 to be slid vertically between the operative and inoperative positions thereof. The sleeve 24 is shown in FIG. 4 in its upper or operative position in which the upper end 32 of the spring is disposed within a narrowed portion 38 at the upper end of the slot 36. Both the upper and lower ends 32 and 34 of the spring may be slidable within a single slot in the frame member 16, as shown in FIG. 4. However, in FIGS. 5 and 6 the ends of the spring are illustrated as engaged within diametrically opposed slots 36 for purposes of simplification in order to show the relative positions of the ends of the spring in a single view.

Referring to FIG. 6, which illustrates the arrangement of the ends 32 and 34 of the spring when the sleeve 24 is in its lower position, it will be seen that, if a rotative force is applied to the sleeve 24 in a clockwise direction, the spring 30 will, due to its frictional engagement with the sleeve 24, tend to rotate with the sleeve 24 around the frame member 16 until the upper end 32 of the spring engages the edge 40 of the slot 36. Such engagement will occur before the lower end 34 of the spring engages the edge 40 of the slot 36. The engagement of the end 32 of the spring with the edge 40 causes the coils of the spring to contract slightly, thereby permitting the sleeve 24 to rotate freely in a clockwise direction on the spring 30. Similarly, if the sleeve 24 is rotated in a counterclockwise direction, the spring 30 will rotate therewith until the lower end 34 of the spring engages the edge 42 of the slot 36, which engagement will occur prior to engagement of the upper end 32 with the edge 42, thereby again tending to contract the coils of the spring 30 so that the sleeve 24 is rotatable in a counterclockwise direction on the spring 30. The spring 30 is freely slidable vertically on the frame member 16 so that when the sleeve 24 is raised or lowered the spring 30 will move therewith relative to the frame member 16. When the sleeve 24 is raised so that the safety bar is in its upper or operative position, the upper end 32 of the spring will enter the reduced portion 38 of the slot 36 in which position the sleeve may be freely rotated in one direction to swing the guard arm inwardly across the seat. In this position, referring to FIG. 5, it will be seen that the sleeve 24 may be rotated freely in a clockwise direction since the upper end 32 of the spring will engage the edge 40 of the slot 36 prior to engagement of the lower end 34 with the edge 40. However, if the sleeve is rotated in a counterclockwise direction, the upper end 32 of the spring will engage the edge 44 of the reduced portion 38 of the slot prior to engagement of the lower end 34 of the spring with the edge 42, thereby to expand the coils of the spring into tight engagement with the sleeve 24 and locking the sleeve against rotation in a counterclockwise direction. The safety arm is therefore automatically adjustable to accommodate different sized individuals since it is merely swung inwardly until it engages across the anterior superior spine of the ilium of the occupant and is then locked against reverse rotation. The device is unlocked by merely lowering the arm slightly until the upper end 32 of the spring is withdrawn from the reduced portion 38 of the slot 36, whereupon the arm may be swung outwardly and then lowered into its inoperative position below the level of the seat 12. In order to retain the sleeve 24 in its operative or locked position during use, it may be desirable to employ a spring attached to the frame member 16 and the sleeve 24 and urging the latter upwardly to prevent accidental or inadvertent release of the guard arm.

In FIG. 7 there is illustrated a form of the invention in which shoulder straps 50 may be employed in conjunction with the safety bars 20. The shoulder straps 50 may be coiled up on reels 52 which are mounted on the frame member 16 within the seat back 10. The reels 52 may be spring biased to normally maintain the straps coiled up on the reels with the outer ends 54 of the straps extending for a short distance through slots 56 in the seat back so as to be accessible for pulling the shoulder straps off of the reels 52. The safety bars 20 may be provided with suitable clasp or fastening devices 58 for securing the outer ends of the shoulder straps to the safety bars at an adjusted position of the straps. The length of the shoulder straps preferably is such that they are pulled out to their full extent and the proper adjustment in length to accommodate different individuals is accomplished by means of the fastening devices 58. The shoulder straps 50 are therefore firmly anchored on the frame members 16 and when used in conjunction with the safety bars 20 provide the maximum protection for the occupant.

In the form of the invention shown in FIGS. 8 and 9, a different type of mounting of the sleeve 124 on the frame member 116 is provided. In this form of the invention the sleeve 124 is provided with a pin 126 extending diametrically thereacross and slidable within diametrically opposed slots 128 in the frame member 116. The sleeve 124 is slidable directly on the frame member 116 and, when in its lower position, the pin 126 is engaged within the laterally extending lower end portions 130 of the slots 128. A spring 132 has its lower end secured to the pin 126 and its upper end secured to a pin 134 fastened to the frame member 116 to urge the sleeve 124 upwardly. When the safety bar is to be moved to its operative position, it is rotated slightly to disengage the pin 126 from the lower ends 130 of the slots 128, whereupon the sleeve may be raised until the pin 126 reaches the horizontal portions 136 of the slots 128 whereupon the sleeve and the guard bar secured thereto may be swung inwardly until the upper end portions 140 of the slots 128 are reached. It will be seen that the shape of the slots is such that the bar is first rotated inwardly slightly further than the extent necessary to obtain the desired engagement with the occupant of the seat and then raised and swung outwardly a few degrees as the pin 126 travels through the portions 140 of the slots. The guard bar can be released only by a force tending to lower the same and at the same time swing the bar inwardly a few degrees, which force is generally opposite to that to which it is subjected when the occupant is thrown forwardly when the vehicle is suddenly stopped. The spring 132 will retain the guard bar against accidental displacement from its locked position.

While two specific forms of locking mechanism have been illustrated herein, it is apparent that numerous mechanical equivalents of the locking and release mechanism may be employed in a device of this type. The essential feature of the invention resides in the provision of a safety bar which can be easily manipulated by the occupant of the seat for movement from a position below the level of the seat to permit entry and exit from the vehicle to a position above the seat level in which it may be swung inwardly into engagement with the above-mentioned portion of the occupant and automatically locked in such position against forces exerted thereon when the occupant tends to be thrown forwardly upon impact.

While I have illustrated and described preferred embodiments of my invention, it is understood that these are capable of modification, and I therefore do not wish to be limited to the precise details set forth but desire to avail myself of such changes and alterations as fall within the purview of the following claims.

I claim:

1. A safety seat for vehicles comprising a seat having a tubular frame member extending upwardly along the sides of the back of said seat and across the top thereof, said frame member being rigidly anchored to the frame of the vehicle, a safety bar mounted on said frame member at each side thereof, said safety bars each comprising a sleeve having a restraining arm rigidly secured thereto, said sleeve being slidable vertically on said frame member between an inoperative position below the level of said seat and an operative position above the seat level, said sleeve being rotatable on said frame member when in said operative position to swing said restraining arm inwardly into engagement with the anterior superior spine of the ilium of the occupant of the seat, and means engaging between said sleeve and said frame member for locking said sleeve against outward swinging movement resulting from the occupant being thrown forwardly during rapid deceleration of the vehicle, said locking means being releasable by manipulation of the said arm by the occupant.

2. A safety seat for vehicles comprising a seat having a tubular frame member extending upwardly along each side of the seat back, said frame members being rigidly anchored to the floor of the vehicle, and a safety bar mounted on each frame member comprising a sleeve having a padded restraining arm extending laterally therefrom, said sleeve being slidable vertically on said frame member between a lower inoperative position and an operative position above the seat level, said sleeve being rotatable on said frame member when in said operative position to swing said arm inwardly into engagement with the anterior superior spine of the ilium of the occupant of the seat, and means engaging between said sleeve and said frame member for locking said sleeve against outward swinging movement resulting from the occupant being thrown forwardly during rapid deceleration of the vehicle, said locking means being releasable by manipulation of the said arm by the occupant.

3. In a safety seat for vehicles, a tubular frame member extending upwardly along the sides of the seat back, a safety bar mounted on each frame member comprising a sleeve having a guard arm rigidly secured thereto, said sleeve being slidable vertically on said frame member between an inoperative position below the level of the seat and an operative position above the seat level, said sleeve being rotatable on said frame member in one direction when in said operative position to swing said guard arm inwardly into engagement with the anterior superior spine of the ilium of the occupant of the seat, and means engaging between said sleeve and said frame member for locking said sleeve against rotation in the opposite direction by a force applied directly thereto in said opposite direction when in said operative position, said locking means being manually releasable.

4. A safety seat for vehicles comprising a frame member anchored to the vehicle frame and extending upwardly along each side of the seat back, a safety bar mounted on each of said frame members comprising a sleeve having a guard arm rigidly secured thereto, said sleeve being vertically slidable and rotatable on said frame member to swing said guard arm inwardly into a position overlying and adapted to be engaged by the anterior superior spine of the ilium of the occupant of the seat, and locking means associated with said sleeve and said frame member for locking said sleeve against outward movement resulting from the occupant being thrown forward against said arm during rapid deceleration of the vehicle, said locking means being releasable by the occupant.

5. A safety seat according to claim 4 including spring means urging said sleeve upwardly on said frame member.

6. A safety seat according to claim 5 wherein said locking means is released by downward movement of said guard arm.

7. A safety seat according to claim 5 wherein said locking means is released by movement of said guard arm downwardly and inwardly toward the occupant.

8. A safety seat for vehicles comprising a tubular frame member extending upwardly along each side of the seat back, said frame members being rigidly anchored to the frame of the vehicle, a safety bar mounted on each of said frame members comprising a sleeve having a guard arm rigidly secured thereto, said frame members having slots therein and said sleeves having pins thereon extending into said slots whereby said sleeves are slidable vertically on said frame members between lower inoperative positions below the seat level and operative positions above the seat level, said sleeves being rotatable on said frame members when in said operative position to swing said guard arms inwardly into engagement with the anterior superior spine of the ilium of the occupant of the seat, said pin and slot connection between said sleeves and frame members locking said sleeves against movement resulting from the occupant being thrown forwardly during rapid deceleration of the vehicle, said sleeves being releasable for movement to their inoperative position by movement of said guard arms downwardly and inwardly toward the occupant.

9. A safety seat according to claim 8 including spring means urging said sleeves toward their upper operative positions.

10. A safety seat for vehicles comprising a tubular frame member extending upwardly along the sides of the seat back and across the top thereof, said frame member being rigidly anchored to the frame of the vehicle, a safety bar mounted on said frame member at each side thereof, said safety bars comprising a sleeve having a guard arm rigidly secured thereto, said sleeve being slidable vertically on said frame member between an inoperative position below the level of said seat portion and an operative position above the seat level, said sleeve being rotatable on said frame member when in said operative position to swing said guard arm inwardly into engagement with the anterior superior spine of the ilium of the occupant of the seat, means engaging between said sleeve and said frame member for locking said sleeve against movement resulting from the occupant being thrown forwardly against said guard arm during rapid deceleration of the vehicle, shoulder straps anchored at one end to said frame member, and fastening means on said guard arms for detachably securing the other ends of said shoulder straps thereto.

11. A safety seat for vehicles comprising a seat portion and a seat back, frame members anchored to the vehicle frame and extending upwardly within the seat back at each side thereof, said frame members having portions thereof exposed in the area of the level of the seat, a safety bar mounted on the exposed portion of each frame member and comprising a sleeve having a guard arm secured thereto, said sleeves being vertically slidable on said frame members, said guard arms being rotatable inwardly into a position overlying and adapted to be engaged by the interior superior spine of the ilium of the occupant of the seat, and means engaging between said sleeve and said frame member for locking said guard arms against outward movement resulting from the occupant being thrown forwardly against said arms upon rapid deceleration of the vehicle, said locking means being releasable by the occupant.

References Cited in the file of this patent
UNITED STATES PATENTS

| | | |
|---|---|---|
| 1,775,988 | Custer | Sept. 16, 1930 |
| 2,275,450 | Manson | Mar. 10, 1942 |
| 2,463,049 | Onsa | Mar. 1, 1949 |
| 2,690,787 | Soltis | Oct. 5, 1954 |
| 2,814,336 | Manhart | Nov. 26, 1957 |